Nov. 23, 1954   W. P. LEAR ET AL   2,695,145
BOOST CONTROL SYSTEM

Filed May 4, 1950   2 Sheets-Sheet 2

$\frac{F}{S}$ (lbs. per degree movement of stick)

$q$ (Dynamic pressure)

INVENTORS.
William P. Lear &
BY Harry N. Eklund

Ronald S. Chenefield
Atty

United States Patent Office 2,695,145
Patented Nov. 23, 1954

2,695,145

BOOST CONTROL SYSTEM

William P. Lear, Santa Monica, and Harry N. Eklund, Pacific Palisades, Calif., assignors to Lear, Incorporated, Grand Rapids, Mich., a corporation of Illinois Application May 4, 1950, Serial No. 160,052

23 Claims. (Cl. 244—83)

This invention relates to a boost system, namely an arrangement for amplifying torque applied to an operating member for actuation of an operated member with increased torque derived from a power source. More specifically the invention has reference to a boost control system for aircraft whereby manual force as applied by the pilot to the control stick is amplified for actuation of the ailerons or other control surfaces of the aircraft.

Recent advances in high-speed jet aircraft have been accompanied by new problems in maneuverability. Higher speeds have resulted in increased hinge moment to a point such that direct actuation of the control surfaces by the pilot becomes impracticable, and not only because of the greater force he is required to exert but any prolonged application thereof. Thus a boost system must be employed which is not only light in weight and compact, but which is sensitive and rapid in response. Moreover a boost system must be employed having characteristics which may be preferably automatically altered in accordance with altitude and air speed, it being recognized that both factors directly influence the amount of torque to which the control surfaces of the airplane must be subjected by the system.

Accordingly a principal object of the invention is to provide a boost control system wherein the pilot's effort is used to release power from a power source for actuation of control surfaces.

An additional object is the provision of a mechanical boost system characterized by sensitivity and rapid response.

Another object is to provide a boost system as aforesaid which will employ as a power source the compressed air available in certain types of jet-engined aircraft.

A further object is to provide a boost system as aforesaid in which instant transfer to an electrical power source may be effected in the event of failure of the air motor.

Another object is to provide an electro-mechanical boost system devoid of hydraulic operating means and the attendant bulk and weight thereof.

Still another object is to provide a boost system including irreversible driving means connected to the control surfaces to avoid overriding of the system by dynamic air pressure against the surfaces.

A further object lies in the provision of a boost control system in which automatic compensation for feel is incorporated, in order that the pilot may sense hinge moments in a manner similar to that encountered in conventional operation, i. e. without irreversibility.

Another object resides in feel compensation as aforesaid which is adjusted automatically as a function of instantaneous altitude and dynamic pressure.

Another object resides in providing a novel form of bridge circuit as part of the feel-adjusting means.

An additional object is to provide novel limiting means for the pilot's stick which, under normal operation, serve to limit the range of movement of the stick, but which the pilot may override under certain conditions by applying excessive control force.

Another object is the provision of novel follow-up means to allow continuous application of power from the power source to the control surfaces notwithstanding a necessarily limited degree of movement of the manual means serving to initiate actuation of the boost system.

Still a further object resides in providing a novel mechanism for trimming the control surfaces.

Other objects include simplicity, compactness, light weight, and substantially universal applicability of the several components to various types of control with a minimum of alternation in the components and mounting thereof.

The invention system incorporates a continuously rotating motor driving contra-rotating clutches. Movement of the pilot's control stick will engage the driven member of the clutch with either of the oppositely rotating driving clutch members, depending upon the direction of movement of the stick. The driven clutch member is keyed to an output shaft which, through flexible shafting, applies power to irreversible actuators, preferably screw jacks, for actuation of the aircraft control surfaces. A position follow-up is incorporated to prevent continuous operation of the output shaft unless pilot stick force is applied, and to establish correspondence between the control stick and control surface. To trim the aircraft, provision is made for adjusting the position of the clutch control shaft relative to the stick position. Provision is made for automatically varying stick force or "feel" in accordance with air speed and altitude, such means including springs whose tension may be varied directly by devices responsive to static and dynamic pressures, or by the interposition of an electro-mechanical actuator responsive to pressure devices actuated by air speed and altitude.

In what follows the invention system will be described in connection with the actuation of aircraft control surfaces, and particularly ailerons, since the same may be regarded as the most complicated of the several surfaces. It will become apparent that the system may be applied equally well to the elevator or rudder. Moreover the system has application to other than aircraft controls as will appear.

In the drawings which show an exemplificative form of the invention:

Fig. 4 is a perspective detail illustrating a modified arrangement of the trim control feature.

Figure 1:
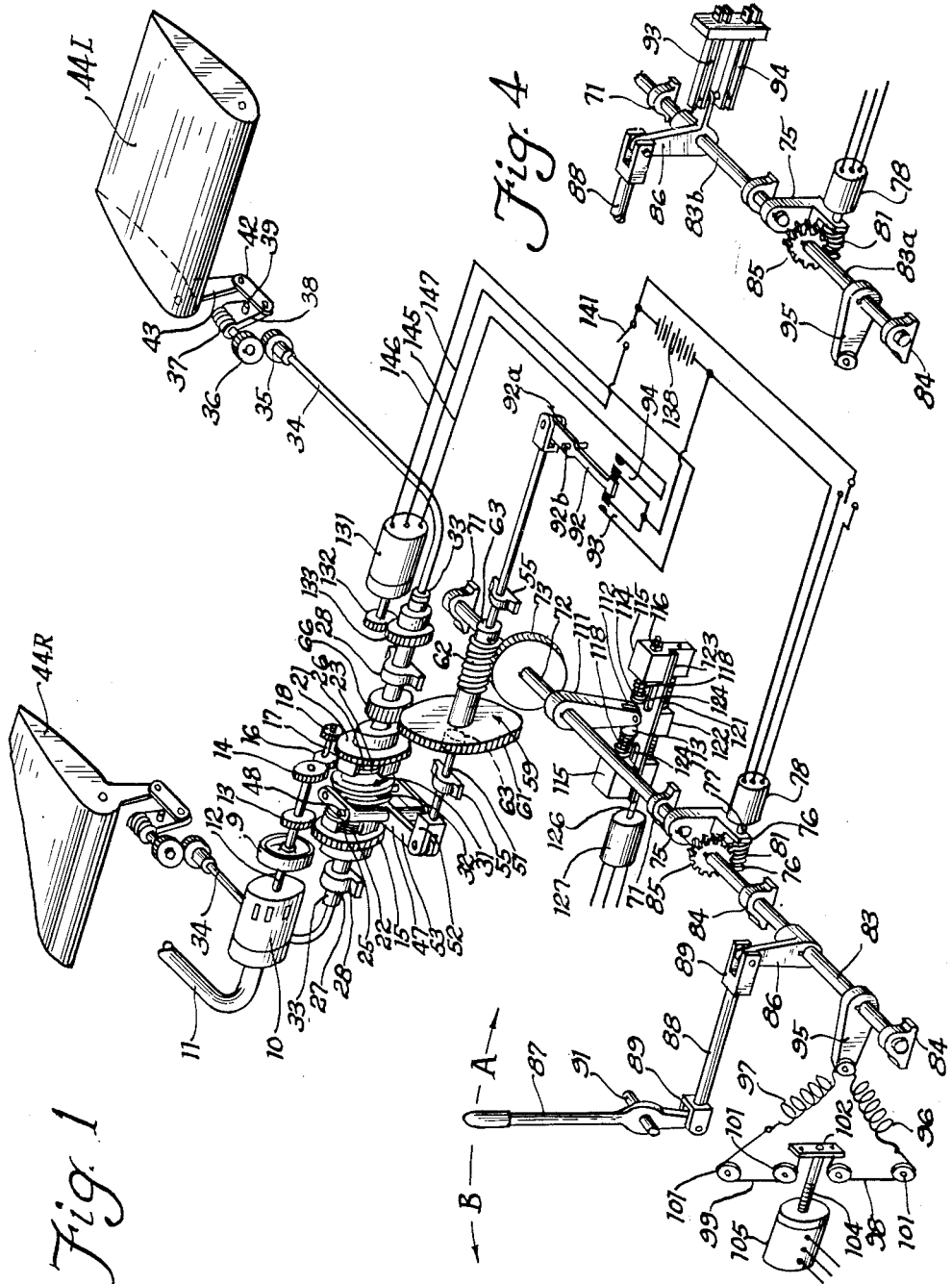
Fig. 1 is a perspective view in assembly of the invention system.

Turning to Fig. 1 the power source is shown as an air motor or turbine 10 having an air line 11 leading thereto from an air compressor (not shown) which latter may be the same used in certain forms of jet-propelled aircraft. In the absence thereof a separate compressor may be employed, or an electric or other motor substituted. Since the compressor pressure of a jet engine is variable, it is desirable to incorporate a pressure regulating valve between the compressor and the turbine.

The output shaft 12 of the turbine 10 has keyed thereto a pair of gears 13 and 14, the former of which is in mesh with a gear 15 and the latter in mesh with an idling pinion 16. Pinion 16 is secured to a stub shaft 17 which has also secured thereto a second idling pinion 18. Bearings (not shown) support the shaft 17. Pinion 18 is in mesh with a gear 21. Thus by reason of the gearing arrangement just described the gears 15 and 21 are rotated in opposite directions. A flywheel 9 may be employed ot store kinetic energy therein between control actions and to deliver the same during control operations, thus relieving the power source of delivering the peak loads.

Attached to each of the gears 15 and 21 is a plurality of driving clutch plates 22 and 23 respectively, the arrangement of which is not particularly pertinent since a single clutch plate may be employed in lieu of each group of plates. Disposed so as to be driven by either of the groups of driving clutch plates 22 and 23 are two groups of driven clutch plates 25 and 26, or, in the case of single driving plates a single driven clutch plate may be used, the same having a pair of apposed clutching faces. Any other suitable type of closed or open clutch may be employed.

Gears 15 and 21 are fixed (by means not shown) in a rotational sense with respect to a main shaft 27 supported for rotation in bearings 28—28, but are arranged for axial movement with respect to the shaft.

Driven clutch plates 25 and 26 are arranged to rotate with the cylindrical member 31 having a peripheral groove 32 therein. Member 31 is free to slide axially as well as to rotate on the shaft. Secured to each end of the shaft 27 by couplings 33—33 are the respective flexible shafts 34—34, whereby output power of the boost system may be connected to the aircraft control surfaces, it being understood that the boost mechanism may be located at a convenient point, and in general remotely from the surfaces actuated thereby.

For connecting the flexible shafts 34—34 to the surfaces any suitable irreversible drive may be utilized. By way of example there is illustrated a pair of pinions 35 and 36, the latter being affixed to a common shaft with a worm 37 supported on suitable bearings (not shown). A worm sector 38 pivoted at 39 is in mesh with the worm 37, and operates a link 42 interconnected with an arm 43 rigid with the ailerons 44R and 44L. Accordingly rotation imparted to the flexible shafts 34—34 will effect tilting movement of the ailerons in opposite senses as will be comprehended. It will be apparent that the relationship of the worm 37 and sector 38 to the respective directions of rotation of the shafts 34—34 is so arranged as to result in upward tilting of one aileron with downward tilting of the other, and vice versa, for appropriate manoeuvring by means of these control surfaces.

It will follow from the preceding description that by reason of the opposite directions of rotation of the gears 15 and 21 and the axial shiftability of the cylindrical member 31, the latter may be displaced to one side or the other for establishing a contact between the driving and driven members of the clutch so as to impart motion to shaft 27 in either sense. In neutral position of the member 31 shaft 27 will remain stationary.

Shifting of member 31 in either axial direction is effected by a fork 47 pivoted at 48 and having pins fitting in the groove 32 of the member 31. Thus reciprocation of the fork will engage the clutch without interfering with rotation thereof. Actuation of fork 47 is through the medium of a connecting rod 51 slidably supported in guides 55—55 and terminating in a clevis 52 pivotally connected to an arm 53 of the fork.

Supported for rotation relative to the rod 51 is an assembly 59 comprising a gear 61 and a worm 62 secured together, and maintained for joint axial movement with the rod 51 by collars 63—63. A pinion 66 is affixed to the shaft 27 for meshing with the gear 61, and is provided with a face sufficiently wide to ensure such mesh regardless of the axial position of the rod 51. The gear 61, pinion 66, worm 62 and worm gear 73 constitute the essence of the "follow-up" arrangement.

Bearings 71—71 support an oscillable shaft 72 having a worm gear 73 keyed thereto and in mesh with worm 62. Also keyed to the shaft 72 is a bracket 75 of suitable form, the horizontally extending portion whereof is bifurcate to provide a pair of bearings 76—76 in which the shaft 77 of a reversible electric motor 78 is rotatably supported. It will be understood that additional support will be provided for motor 78, as by having the front housing thereof integral with, or otherwise secured to the bracket 75, but for clarity such obvious detail has been omitted. A worm 81 is keyed to shaft 77, and is maintained longitudinally by confinement between the bearings 76—76. Worm 81 and worm gear 85 in part constitute the "trim" control to be elaborated upon hereinafter.

Another shaft 83, in axial alignment with shaft 72, is supported in bearings 84—84, and has keyed to one end thereof a worm gear 85 in mesh with the worm 81. A crank arm 86 is also keyed to the shaft 83 and connects with the pilot's control stick 87 by means of a link 88 and clevises 89—89. Stick 87 may take any convenient form known in the airplane art, and may be capable of movement in planes other than that required for operation of the invention system. Insofar as the instant invention is concerned the stick has, for simplicity, been illustrated as movable only in a single plane, namely that for aileron control.

Shaft 51 is provided at its right end with a clevis 92a pivotally connected to a lever arm 92, pivoted at 92b, and adapted to close one or the other of pairs of contacts 93 or 94 upon movement of the stick 87 with consequent axial movement of shaft 51, the neutral position of the stick corresponding to "open" condition of both sets of contacts. The electrical arrangement including such contacts will be detailed hereinafter.

Keyed to the shaft 83 is a crank arm 95 to the free end of which one end of each of a pair of coil springs 96 and 97 is secured. Cables 98 and 99 are attached to the opposite end of each spring, and pass over sheaves 101 pivoted on the framework (not shown) of the control device. The opposite end of each cable 98 and 99 is secured in a plate 102 swivelly carried and guided (by means not shown) relatively to the screw 104 of a reversible motor driven linear actuator or screwjack 105 of any well-known type, and whereby extension or retraction of the screw 104 is effective to increase or decrease the tension of springs 98 and 99 simultaneously. The foregoing arrangement constitutes certain components of the "feel" control.

Shaft 72 is also provided with a keyed crank arm 111 carrying a pivoted roller 112 at the free end thereof. Arranged to be abutted by the roller 112 is a pair of yieldable members 113 and 114, each including a head and a stem, the members being slidably supported in crossheads 115—115 and retained by lock nuts 116. Compression springs 118—118 are respectively interposed between the head of each member 113 or 114 and its respective crosshead 115. In the neutral position of the arm 111 the roller 112 is out of contact with either member 113 or 114.

Crossheads 115—115 are each provided with a downward extension or rib having a threaded aperture engaged by a screw 121 supported in block 122 forming part of the frame 123. Slots 124—124 in the frame 123 serve as guides for the crossheads 115. The screw 121 is coupled to the shaft 126 of a reversible electric motor 127, by reason of which rotation of motor 127 in one direction or the other will move the members 113 and 114 simultaneously toward or away from the roller 112, and for which purpose the respective threaded portions of screw 121 will be cut right and left handed.

For emergency drive, in the event of failure of the air turbine 10, a reversible electric rotary actuator 131 may be connneted to the main shaft 27 by a pinion 132 and gear 133. Such rotary actuators are well-known devices of commerce, and include an electromagnetic clutch energized upon closure of the circuit to the motor thereof. Thus in the open condition of such circuit shaft 27 may rotate gear 133 and pinion 132 without driving the motor armature.

The several electrically operated components may derive current from any convenient source aboard the aircraft, e. g., a battery 138. The trim motor 78 may be rotated in either direction by means of a manually operated single pole-double throw switch 139, which may, if desired, be located at a convenient point on the stick 87. Sets of contacts 93 or 94 close circuits for operation of emergency motor 131 in "forward" or "reverse" provided, of course, that switch 141 is first closed following the occurrence of the emergency. The "feel" control motor 105 will be referred to in detail hereinafter.

Operation of the system as thus far described is as follows: Assuming that the pilot actuates the stick 87 in the direction of the arrow A, the crank 86 will be rotated counter-clockwise for corresponding rotation of the shaft 83 against the torque produced by the combination of springs 96 and 97. Inasmuch as the lead of worm 81 is selected to insure against rotation thereof by worm gear 85 the shaft 72 will also be rotated counter-clockwise. Such rotation is normally limited by engagement of the roller 112 against the head of stop member 114. So long as the pilot employs what may be termed normal stick force, spring 118 may not be depressed. However if greater than normal force is required in an emergency the spring 118 may be overridden. Adjustment of the degree of compression of springs 118 may be effected by nuts 116 which are effective to move members 113 and 114 relatively to the crossheads 115—115.

Rotation of shaft 72 rotates worm gear 73. However, since the lead of worm 62 is so selected as to obviate driving of the worm by the worm gear, such rotation will simply thrust the worm and its associated rod 51 axially to rock the fork 47 clockwise (as viewed from above). Thus that half of the clutch including driving and driven plates 23 and 26 will be activated for applying power to the shaft 27 for rotation in a direction to tilt one aileron say 44L, upwardly and the aileron 44R downwardly. By reasons of the irreversible drive comprising worm sector 38 and worm 37 the ailerons will be maintained in any position to which they are driven until moved by the control system to a new position.

In order to produce a motion of the pilot's control stick corresponding to the motion of the control surfaces, it is necessary to incorporate a follow-up mechanism between power shaft 27 and shaft 83 linked to the pilot's stock 87. Accordingly rotation of the pinion 66 secured to the shaft 27 will, upon rotation of the latter, drive the gear and worm assembly 59 in a direction such as to cancel the effect of rotation of the coupled shafts 72 and 83 imparted by the pilot's actuation of the stick 87, and thus to cause disengagement of the clutch. Consequently upon termination of the force applied to the stick 87 and a retention thereof in the position to which it has been actuated, the clutch will be disengaged, or vice versa, to maintain the clutch engaged against the neutralizing action of the follow-up mechanism pressure on the stick must be maintained. Stated otherwise, if the pilot exerts sufficient force on the stick to overcome the constraint of the springs 96 and 97, and to maintain the clutch engaged to the degree necessary to move the ailerons, the worm 62 will rotate the worm wheel 73, and thus move the stick at a rate proportional to the movement of the ailerons, so that continual correspondence between stick position and aileron position is achieved.

When the selected position of the ailerons has been attained, release of stick force will bring about interruption in rotation of shaft 27, and the ailerons will remain where set. As long as the pilot retains the stick in the position corresponding to that selected aileron position, and with just sufficient force to balance the feel springs 96 and 97, but insufficient to engage the clutch, the ailerons will experience no change in position.

In the invention system, displacement of the pilot's stick is proportional to displacement of the ailerons. If force on the stick is released, the shafts 83 and 72 will be driven by the springs 96 and 97 in a direction opposite to the previous displacement to restore the ailerons to zero position. Torque exerted on the shaft 83 by the springs 96 and 97 may be varied as a function of the altitude and air speed, and in a manner to appear.

To avoid overloading of the airplane wing structures due to excessive deflection of the ailerons, and at times when a high dynamic pressure exists, the spring-loaded members 113 and 114 are incorporated. Thus, the pilot is normally prevented from moving the ailerons to a position where unsafe aerodynamic loads may occur by abutment of the roller 112 against a member 113 or 114. Limiting position of each of the members 113 and 114 may be adjusted automatically by the actuator 127, and pursuant to electrical means to be described hereinafter. However, regardless of the then set position of the stop members 113 and 114, the pilot may, in his discretion, override the stop members by compressing one or the other of the springs 118.

Trimming of the aircraft, i. e. displacing the ailerons relative to the control stick so as to obviate the necessity for the pilot to hold the ailerons deflected to compensate for aerodynamic unbalance of the aircraft, is accomplished by the worm 81 and worm gear 85 interconnecting shafts 72 and 83. By movement of switch 139 to one pole or the other, the motor 78 may be rotated in one or the opposite sense to vary the angular relation between the shafts 72 and 83. Since shaft 83 is withheld from rotation by spring 96 or 97, depending upon the direction of trim, energization of motor 78 will engage the clutch to set up the desired aileron position in trim. Consequently, operation of the trim control may be accomplished without disturbing the center position of the stick and, likewise, motion of the stick may be effected without disturbing the trim setting. One outstanding advantage resulting from the foregoing trim control feature is the elimination of trim tabs or other adjustable stabilizing surfaces.

An alternative arrangement for trim operation, which duplicates this requirement in conventionally controlled aircraft comprises the location of the trim control mechanism intermediate the pilot's stick and the automatic feel control, and is shown in Fig. 4. Those parts common to this figure and Fig. 1 are assigned like reference numerals. In effect the modification involves the separation of the shaft 83 of Fig. 1 into two parts 83a and 83b with the worm gear 85, worm 81, actuator motor 78 and bracket 75 inserted at this location for relative angular adjustment of the arm 95 relative to the bell crank 86. Shaft 72 of Fig. 1 now becomes a continuation of shaft 83b, the drive from the bell crank 86 to the worm gear 73 being through this rigid shaft connection. Now trim will be accomplished simply by shifting the neutral position of the stick 87 to the position which the stick would occupy when the ailerons are deflected to the position required for trim. Stated otherwise, after the pilot has moved the ailerons to the trim position, the motor 78 is activated to bring the force of spring 96 or 97 to zero at that corresponding stick position without affecting the ailerons directly. This removes the spring load from the stick at the trim position, which is precisely what occurs when trim tabs are operated in conventional aircraft. The stick will now remain in trim position instead of returning to neutral.

The foregoing modified arrangement does not alter the functioning of the automatic feel adjustment to be described hereinafter. Moreover the ailerons can still be operated by the trim motor 78 if the pilot releases the stick. In such case the spring 96 or 97 will supply the force causing the ailerons to follow the neutral point of the springs.

In connection with the modification of Fig. 4, however, it is desirable to include an indicator to show aileron deflection into a trimmed condition in order to avoid inadvertent take-off at an undesirable trim position.

In the event of failure of the air turbine 10, or of the source of supply therefor, closure of switch 141 will provide emergency service through the medium of rotary actuator 131. It will be noted that in this event contacts 93 and 94 serve to energize the actuator motor for rotation in either direction depending upon the sense of movement of the stick 87. Moreover it will be understood that conductors 145 and 146 will be connected to the separate field windings of the actuator motor for reversible operation, and that conductor 147 is common to these windings.

From the foregoing it will be comprehended that opposite actuation of the stick 87, i. e., per arrow B, will result in opposite response of the boost control, in which event that half of the clutch including driving and driven plates 22 and 25 will be utilized.

During electrical emergency control as just detailed, the follow-up action is similar in nature to that obtained in normal mechanical operation, except that the axial motion of shaft 51 will now cause contacts 93 and 94 to open the energizing circuit of actuator 131 to stop the same, instead of disengaging the clutch as in the case of the mechanical operation with follow-up.

In the case of directly connected aileron controls the pilot can immediately sense aileron reaction and adjust the position thereof accordingly. However the boost system of the invention is so constructed and arranged as to prevent any aileron reaction from reaching the pilot's stick, and therefore the pilot is unable to "feel" the aileron position as affected by aerodynamic forces thereon. For the foregoing reasons the invention system includes means for simulating the "feel" experienced with such directly connected controls.

For reasons connected with the safe and competent control of an aircraft, it is desirable to make the simulated feel a predetermined function of dynamic pressure and altitude. This is particularly important in the case of aileron control in order to prevent excessive rolling velocities at low dynamic pressures or high altitudes by inadvertently applying too high a stick force.

Figure 3:
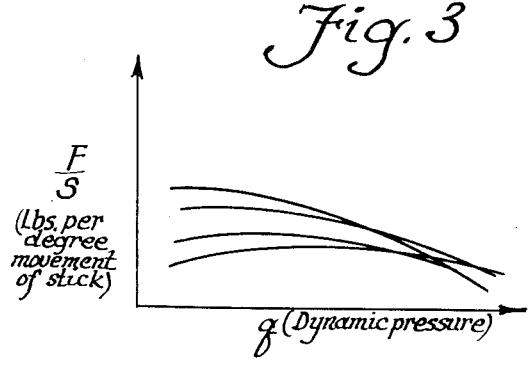
Fig. 3 is a graph to illustrate the functioning of the mechanism and circuitry of Fig. 2.

Referring to Fig. 3 there is shown in graphical form the variation of stick force in pounds per degree of movement of the stick as compared with $q$, the dynamic pressure, and for several values of altitude $h$ in feet. Such curves are not parallel or even substantially so, but tend to approach or cross each other with increase in $q$. Consequently in the automatic "feel" adjusting means herein provided both altitude $h$ and dynamic pressure $q$ are taken into account.

Figure 2:
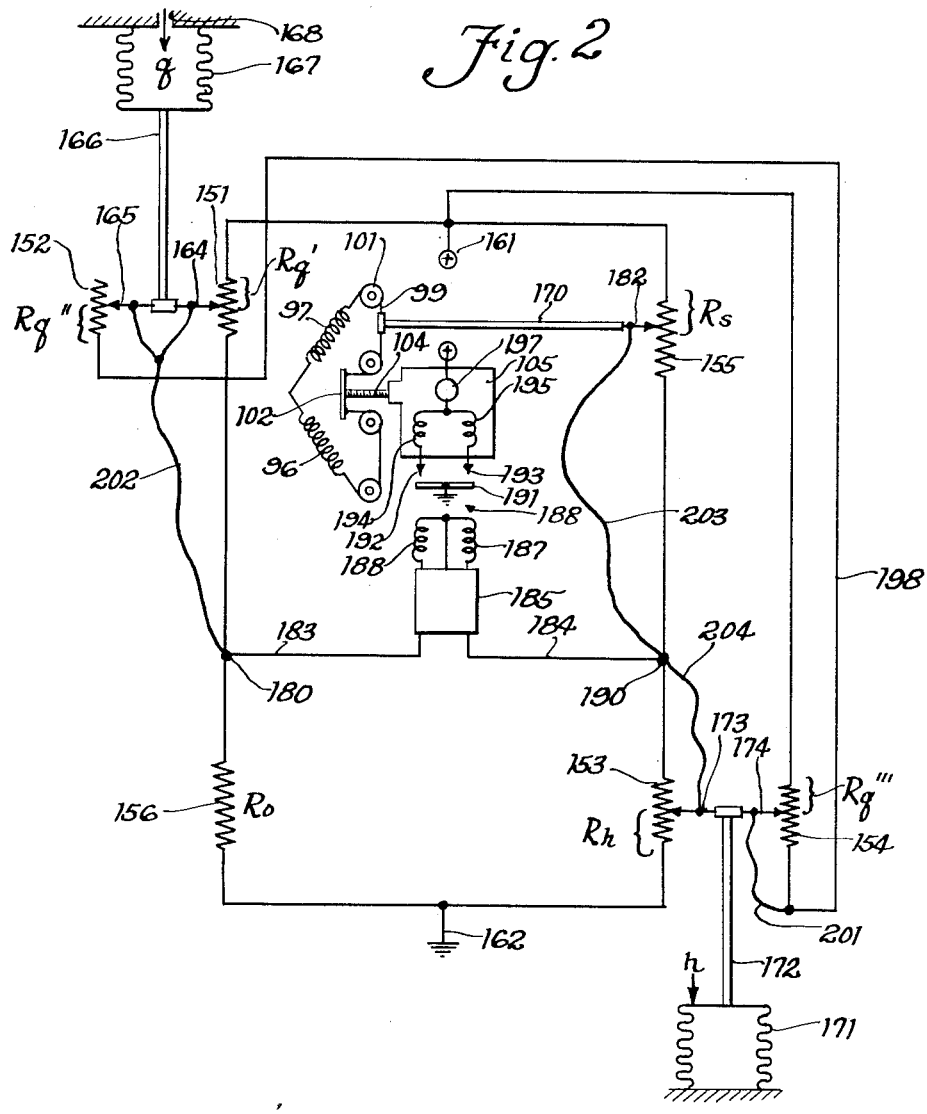
Fig. 2 is a schematic diagram of one form of the feel adjustment arrangement.

Turning to Fig. 2 several of the parts forming part of the "feel" adjusting means and described in connection with Fig. 1 bear the same reference characters.

Basically the "feel" adjusting means incorporates a bridge circuit comprising potentiometers 151 and 152 in parallel as one arm, potentiometer 153 as the diagonally opposite arm, potentiometer 155 as a third arm, and resistor 156 as the fourth arm. Potentiometer 154, while adjustable jointly with 153, is not strictly part of that same arm, as will appear. Current input to the bridge is indicated as direct current at 161 and 162, although alternating current may be utilized if desired.

Wipers 164 and 165 of potentiometers 151 and 152 respectively are carried on an insulated member forming the head of a rod 166, such latter being suitably secured to the free end of a bellows 167. The opposite end of the bellows is fixed and its interior is in fluid connection with a passage 168 through which the dynamic pressure $q$ may be sensed and by the use of any well-known means on the aircraft. Thus extension and retraction of the bellows serves to vary the active portions of potentiometers 151 and 152 in circuit.

It will be understood that, for clarity, the mechanism shown interconnecting bellows 167 to wipers 164 and 165 is schematic only, since in practice some form of linkage for translating the relatively small rectilinear motion of the bellows into the necessarily greater linear or rotary movement of the potentiometer wipers would be employed.

Another bellows 171 which has been evacuated and closed, and is secured by one end to a fixed support, actuates a rod 172 to which are attached the wipers 173 and 174 of potentiometers 153 and 154. Bellows 171 will increase in length approximately proportionally to the altitude $h$. Rod 172 is represented schematically only, and will, in practice, take the form of a linkage or its equivalent, with rod 166.

Cable 99 actuates a rod 170 secured thereto, the outer end of the rod carrying the wiper 182 of potentiometer 155. Accordingly traverse of the cable 99 will vary the amount of potentiometer 155 actively in circuit. As explained in regard to rods 166 and 172 the rod 170 would, in practice, take another form more suited to translation of cable movement into potentiometer adjustment.

The output of the bridge at terminals 180 and 190 is applied through conductors 183 and 184 to a push-pull thermionic power amplifier 185 or equivalent device, the output whereof is effective on the operating coils 187 and 188 of a relay 188, preferably of the polarized type. Amplifier 185 will be phase-discriminatory in order that the same will respond to the phase of the output signal from the bridge, and in a manner understood by those in this art.

Armature 191 of relay 188 is connected to ground and is adapted to close against one or the other of the contacts 192 or 193 thereof, these latter being respectively connected to the "forward" and "reverse" field windings 194 and 195 respectively of the actuator motor 105. Positive polarity is supplied to the armature 197 of the motor, the other brush of which is connected in common with field windings 194 and 195.

Potentiometer 154 is connected, via a lead 198, to one terminal of potentiometer 152, and by a lead 201 to the wiper 174. Wipers 164 and 165 are connected in common and by a conductor 202 to one output terminal 180 of the bridge. Wipers 173 and 182 are connected via leads 203 and 204 respectively to the other bridge output terminal 190.

If required by the functioning of the system, the several potentiometers and resistor shown may, if required by any non-linear relationship of the variables fed into and out of the "feel" control system, be of tapered or other form, as will be understood.

Assuming the bridge is in balance as a result of a prior "feel" adjustment, and potentiometers 153 and 154 therefore in status quo, any variation of $q$ evidences itself by extension or retraction of the bellows 167, in turn to vary the amount of resistance between wiper 164 and bridge input terminal 161. Thus the bridge is unbalanced to feed a signal of one phase into amplifier 185 for operation of armature 191, and consequent rotation of armature 197. As a result plate 102 is driven by actuator screw 104 in a direction to change the tension of springs 96 and 97, and hence the "feel" of the pilot's stick. Should $q$ increase the arrangement of the parts is such that the tension of springs 96 and 97 increases proportionately, and vice versa.

Rebalancing of the bridge in response to a change in the setting of potentiometers 151 and 152 is accomplished by the follow-up comprising arm 170 and potentiometer 155, such rebalance cancelling the output signal at terminals 180 and 190.

Change in altitude $h$ is also effective in unbalancing the bridge by reason of bellows 171 and potentiometer 153, with rebalancing as before by potentiometer 155. Since bellows 171 is evacuated, any change in $h$ will effect extension or retraction of the bellows proportionately, and with the production of a suitably phased output signal at 180 and 190 for adjustment of the "feel" springs 96 and 97.

However $q$ and $h$ are not independent, and it becomes necessary to insert a resistance proportional to $h$ in series with the resistance resulting from the setting of potentiometer 152. The effect of resistance inserted by potentiometer 154 is to change the slope of the altitude curves in Fig. 3 with variation in $q$. Accordingly for each position of bellows 171 the wiper 174 will define a resistance of potentiometer 154 between "plus" battery at 161 and terminal 180. Such circuit can be traced from "plus" battery at 161, active position of potentiometer 154, wiper 174, leads 201 and 198, active part of potentiometer 152, wiper 165, lead 202 to terminal 180. In this manner the amount of resistance in that leg of the bridge intermediate terminals 161 and 180 is made a function of both $q$ and $h$.

The variable automatic artificial feel for the pilot stick incorporated by virtue of the components described in connection with Fig. 2 reflects conditions prevailing about the ship as a whole, i. e., altitude and speed determine the extent of the resistance felt by the pilot through the stick. Both static and dynamic pressure are thus employed to secure proper interpretation of the conditions prevailing about the aircraft.

A simplified mathematical analysis of the "feel" adjustment arrangement of Fig. 2 is here included by way of amplification.

Specifying the various resistances taking part in the electrical system by reference characters there shown the following relations become evident:

$$R_s = \frac{R_h R_q}{R_o}$$

where $R_q$ is all resistance active at a selected instant in the bridge leg from terminals 161 to 180.

Then $$R_q = \frac{R_q'(R_q'' + R_q''')}{R_q' + R_q'' + R_q'''}$$

$$R_q' = C'q$$

$$R_q'' = C_o'' - C''q$$

$$R_q''' = C_o''' - C'''h$$

and $$R_h = C_h h$$

where $C'$, $C''$, $C'''$ and $C_h$ are any desired constants,
$C_o''$ is the total resistance of potentiometer 152
$C_o'''$ is the total resistance of potentiometer 154.

Thus the balance or imbalance of the bridge may be made to vary as a function of $q$ and $h$, and in a manner dependent upon the actual relationship between these variables as related to stick force per degree displacement thereof ($F/S$).

It will be appreciated that the several curves of Fig. 3 will, in each case, be determined by actual measurements under actual flight test of the aircraft in question, or by means of a scale model and wind tunnel. Accordingly the values of the resistors comprised in the circuitry of Fig. 2, and the variation of such resistors with $q$ and $h$, whether linear or non-linear will be dependent upon the flight characteristics of the selected aircraft. For these reasons the formulae just outlined are set out only indicatively of the manner in which the bridge may be designed and made to function.

While we have shown particular embodiments of our invention, it will be understood, of course, that we do not wish to be limited thereto since many modifications may be made, and we therefore contemplate by the appended claims to cover any such modifications as fall within the true spirit and scope of our invention.

Having thus described our invention, what we claim and desire to secure by Letters Patent is:

1. A boost system of the class described comprising a surface supported for actuation in two directions, a source of power, a bi-directional clutch having a driven member and a pair of driving members, means connecting said source to said driving members for opposite rotation thereof, means interconnecting said surface to said driven member, a pilot's stick having a limited degree of rocking movement, a connection between said stick and driven member for engagement of the clutch for one or the opposite direction of rotation upon corresponding movement of said stick, and a follow-up mechanism engaging said connection with said interconnecting means for providing continued engagement of said clutch notwithstanding limitation of movement of said stick.

2. A system as recited in claim 1 in which said follow-up mechanism comprises a shaft, a connection between said stick and shaft for translating pivotal movement of said stick into rotation of said shaft, a worm gear secured to said shaft, a worm in mesh with said gear, an axially movable rod for supporting said worm for free rotation thereon, said worm being axially fixed for joint movement with said rod, a connection between said rod and clutch whereby the clutch may be engaged upon application of force to said stick, a gear unitary with said worm, and a pinion carried by the output side of said clutch in mesh with said gear.

3. A system as recited in claim 1 in which said follow-up mechanism comprises an adjustable connection between said stick and clutch, the adjusting means therefor comprising gearing for continuously varying the angular relationship between said stick and the output side of said clutch whereby the clutch may be maintained engaged during application of pressure to the stick and will become disengaged upon interruption of said pressure.

4. A boost system for power actuation of an aircraft control surface in response to manual operation of a controlling member comprising a power source, a clutch, a first shaft, means connecting the controlling member to said shaft for rotation thereof, a second shaft, means connecting said second shaft to said clutch, and means for trimming the control surface comprising a coupling between said shafts for joint rotation thereof, said coupling including two angularly adjustable portions for varying the angular relation of said shafts.

5. A system as recited in claim 4 in which said coupling comprises a bracket secured to one of said shafts and having a worm rotarily supported thereon, a worm gear secured to the other of said shafts and in mesh with said worm, and power means for rotating said worm.

6. A system as recited in claim 5 in which said power means is provided with a flexible shaft to said worm.

7. A system as recited in claim 5 in which said power means is carried by said bracket.

8. In boost control apparatus for power actuation of an aircraft control surface in response to manual pressure exerted on the pilot's stick, which includes power means, means for coupling said power means to the surface for actuation thereof and means connecting the stick to said coupling means, feel-control means comprising bias means operatively associated with said connecting means for simulating the feel normally experienced by the pilot in non-boost control-surface actuation, devices for respectively sensing the instantaneous altitude and dynamic pressure and means under the control of said devices for varying the bias in response to the instantaneous altitude and dynamic pressure.

9. Apparatus as recited in claim 8 in which said bias means comprises a spring, and said bias-varying means comprises an electrical device for changing the force of said spring from a predetermined normal, electrical bridge means providing an output voltage to said device, said bridge means including potentiometers connected to said sensing devices and variable to provide said voltage.

10. Apparatus as recited in claim 9 in which the means connecting the potentiometers to the sensing devices comprises bellows and operating links from said bellows to said potentiometers.

11. In a boost control apparatus for power actuation of an aircraft control surface in response to torque manually applied to the pilot's stick which includes power means, a clutching device, means for coupling said power means to said device to provide torque to the input side thereof, and means for connecting the output of said device to the surface, feel-control means comprising a linkage from the pilot's stick to said device for engaging said device, bias means operatively connected to said linkage for normally maintaining said device in disengaged condition, and means controlled by the dynamic pressure on the surface and means controlled by the instantaneous altitude of the aircraft, said two last mentioned means being jointly connected to said bias means for adjusting the bias thereof automatically in response to said pressure and altitude.

12. Apparatus in accordance with claim 12 in which said linkage includes a shaft and an arm extending radially from said shaft, and said bias means includes a spring arranged to exert a force on said arm which has a substantial radially directed component and a substantial tangentially directed component.

13. Apparatus in accordance with claim 12 in which said linkage includes a shaft and an arm extending radially from said shaft, and said bias means includes a pair of springs each arranged to urge said shaft in opposite rotational senses, the axes of said springs being arranged angularly divergent to exert a force on said arm which has a substantial radially directed component and a substantial tangentially directed component, one end of each spring being secured to said arm and the other end of said spring being adjustably fixed.

14. Apparatus in accordance with claim 13 further characterized by means for adjustably fixing the other end of said springs which includes a device to which said ends are anchored, the means actuated by the dynamic pressure and altitude being connected to said anchoring device for moving said device to alter the force of said springs in response to said pressure and altitude.

15. In a boost control apparatus for power actuation of an aircraft control surface in response to torque manually applied to the pilot's stick which includes a power source, bi-directional clutching means and means for actuating the clutching means in response to movement of the stick, feel-simulating mechanism comprising a shaft forming a part of the clutch actuating means, an arm extending radially from said shaft, a pair of coil springs each having one end operatively connected to the free end of said arm, a linearly movable member, means for operatively connecting the other end of each spring to said member, each said spring being disposed at an angle to the axis of said arm, and which angle is other than a right angle, and power means for moving said member to vary a predetermined stressed condition of said springs.

16. In a boost control apparatus for power actuation of an aircraft control surface in response to torque manually applied to the pilot's stick including a power-driven clutching device engageable by force applied to the stick for engaging said device, feel-control means comprising bias means for normally maintaining said device in disengaged condition, bias-adjusting means, an instrument for translating the instantaneous dynamic pressure into a voltage proportional thereto, an instrument for translating the instantaneous barometric pressure into a voltage proportional thereto, an electrical bridge including an input potential source, means for combining said voltages and source to provide an input signal to said bridge, and means for actuating said bias-adjusting means in response to the output of said bridge.

17. In a boost control apparatus for power actuation of an aircraft control surface in response to torque manually applied to the pilot's stick, and which includes a power source, a clutch for coupling said power source to the surface and a clutch engaging member, trim control means comprising a two-part connection between the stick and the clutch, the stick being secured to one part and the member being secured to the other, feel simulating means including a bias-producing device for providing bias to said one part, and a device interposed intermediate said parts and joining the same, and means for actuating said device to alter the relative position of said parts to vary said bias and the position of the stick relative to the clutch-engaging member.

18. Apparatus in accordance with claim 17 in which said device comprises a worm gear secured to one of said parts and a bracket secured to the other said part, and a worm revolubly carried in said bracket and in mesh with said gear, and said device-actuating means comprises a motor for rotating said worm.

19. In a boost control apparatus for power actuation of an aircraft control surface in response to force manually applied to the pilot's stick which includes bidirectionally rotatable power means and means connecting the stick to said power means for energizing said device in response to actuation of the stick in one or the opposite sense for corresponding movement of the control surface, said energizing means also including a shaft feel-control means for simulating in the response of the stick the feel normally sensed by the pilot in direct manual actuation of the aircraft control surfaces comprising an arm extending radially from the shaft, a pair of coil springs each having one end secured to the outer end of said arm, a linearly movable member, a cable for joining the other end of each said spring to said member, each said spring being disposed so as to exert a force substantially tangentially to the shaft, means for guiding said cables, a reversible electric motor for moving said member to vary a predetermined stressed condition of said springs and electrical means responsive to the instantaneous altitude and dynamic pressure for driving said motor in one direction or the other for varying the feel.

20. Boost control apparatus for amplifying manual torque for operation of a controlled member comprising a source of power, a clutch, a driving connection between said source and the input side of said clutch, a second connection between the output side of said clutch and the controlled member, a manually operable member, a third connection between said member and clutch for engaging said clutch, said third connection including force-transmitting means, a driving connection between the output side of said clutch and said means operable upon said means to vary said third connection for follow-up of said manual means during engagement of said clutch, said force-transmitting means including a worm-gear arranged for rotation by said manually operable member, a worm in mesh with said gear, a rod for rotatably supporting said worm, means for fixing said worm and rod relatively axially, a connection between said rod and said clutch, and means interconnecting the output of said clutch to said worm for rotation thereof and of said worm gear to restore continuously said member to a position corresponding to disengaged condition of said clutch.

21. Apparatus as recited in claim 20 in which said last mentioned means comprises a gear affixed to said worm for joint rotation therewith, and a pinion in mesh with said gear and secured to the output side of said clutch.

22. Boost control apparatus comprising a controlled member, power means for actuating said member, a controlling member, means interconnecting said controlling member to said power means, and means incorporated in said interconnecting means for altering the position of the controlled member relative to the controlling member including a first shaft actuable by said controlling member, a second shaft for transmitting movement of said first shaft to said power means, and means connecting said shafts for changing the relative angular position thereof.

23. Boost control apparatus comprising a controlled member, power means for actuating said member, a controlling member, means interconnecting said controlling member to said power means, and means incorporated in said interconnecting means for altering the position of the controlled member relative to the controlling member including a first shaft actuable by said controlling member, a second shaft for transmitting rotary movement of said first shaft to said power means, a bearing bracket carried by one of said shafts and having a worm rotarily mounted therein, a worm gear secured to the other of said shafts and in mesh with said worm, and means for rotating said worm to cause swinging of said bracket and the shaft secured therewith about the axis of the other said shaft.

References Cited in the file of this patent

UNITED STATES PATENTS

| Number | Name | Date |
|---|---|---|
| 1,998,939 | Mittag | Apr. 23, 1935 |
| 2,032,658 | Gille | Mar. 3, 1936 |
| 2,183,932 | Carlson | Dec. 19, 1939 |
| 2,227,375 | Carlson | Dec. 31, 1940 |
| 2,277,378 | Wells | Mar. 24, 1942 |
| 2,294,906 | Holloman et al. | Sept. 8, 1942 |
| 2,311,010 | Vickers | Feb. 16, 1943 |
| 2,344,352 | Graham | Mar. 14, 1944 |
| 2,433,826 | Brown | Jan. 6, 1948 |
| 2,445,343 | Tyra | July 20, 1948 |
| 2,445,900 | Wisman | July 27, 1948 |
| 2,508,883 | Knowler et al. | May 23, 1950 |
| 2,512,902 | Rossire | June 27, 1950 |
| 2,517,680 | Knowler et al. | Aug. 8, 1950 |